United States Patent [19]
Kahleck et al.

[11] Patent Number: 5,673,190
[45] Date of Patent: Sep. 30, 1997

[54] MULTIPURPOSE REMOTE OFFICE MACHINE MANAGEMENT SYSTEM

[75] Inventors: Curtis O. Kahleck, Savage; Steven D. Riedel, Eden Prairie; Thomas D. Correll, Bloomington, all of Minn.

[73] Assignee: Atrix International, Inc., Burnsville, Minn.

[21] Appl. No.: 408,563

[22] Filed: Mar. 22, 1995

[51] Int. Cl.$^6$ .................. G05B 15/02; G05B 23/02
[52] U.S. Cl. .............. 364/131; 364/143; 364/145; 364/138; 340/825.06; 340/825.16; 355/206
[58] Field of Search ................ 364/131, 132, 364/138, 143, 145, 146, 188; 395/200.09; 355/203, 204, 205, 206; 358/442; 340/825.06, 825.16

[56] References Cited

U.S. PATENT DOCUMENTS

| | | | |
|---|---|---|---|
| 3,558,224 | 1/1971 | Murgas | 355/51 |
| 3,700,326 | 10/1972 | Murgas et al. | 355/14 |
| 3,997,873 | 12/1976 | Thornton | 340/149 |
| 4,071,911 | 1/1978 | Mazur | 364/900 |
| 4,086,434 | 4/1978 | Bocchi | 179/2 AM |
| 4,124,887 | 11/1978 | Johnson et al. | 364/107 |
| 4,144,550 | 3/1979 | Donohue et al. | 364/131 |
| 4,167,322 | 9/1979 | Yano et al. | 355/3 R |
| 4,314,334 | 2/1982 | Daughton et al. | 364/138 |
| 4,358,756 | 11/1982 | Morel et al. | 340/539 |
| 4,497,037 | 1/1985 | Kato et al. | 364/900 |
| 4,501,485 | 2/1985 | Tsudaka | 355/6 |
| 4,583,834 | 4/1986 | Seko et al. | 355/14 |
| 4,752,950 | 6/1988 | Carpentier | 379/106 |
| 4,855,754 | 8/1989 | Tanaka et al. | 355/206 |
| 4,965,676 | 10/1990 | Ejiri et al. | 358/406 |
| 5,016,059 | 5/1991 | Smeiman | 355/308 |
| 5,077,582 | 12/1991 | Kravette et al. | 355/206 |
| 5,084,875 | 1/1992 | Weinberger et al. | 371/29.1 |
| 5,086,385 | 2/1992 | Launey et al. | 364/188 |
| 5,184,179 | 2/1993 | Tarr et al. | 355/206 |
| 5,282,127 | 1/1994 | Mii | 364/130 |
| 5,289,365 | 2/1994 | Caldwell et al. | 364/138 |
| 5,400,246 | 3/1995 | Wilson et al. | 364/146 |
| 5,412,779 | 5/1995 | Motoyama | 355/203 |

FOREIGN PATENT DOCUMENTS

| | | | |
|---|---|---|---|
| 0121332 | 1/1984 | European Pat. Off. | G07C 9/00 |

*Primary Examiner*—Paul P. Gordon

[57] ABSTRACT

A multipurpose remote office machine management system for use with photocopy machines, fax machines, document scanners and printers, for example, provides stand alone, remote or cabled monitoring and control of selected office machines at predetermined times and dates via multiple modes of communication, including, but not limited to shared or dedicated telephone lines as well as radio frequency communication. The system monitors and reports designated information to an operator, including for example, number of copies produced, number of attempts by unauthorized individuals to access the office machine, number of primary and secondary copies produced, number of black and white and color copies produced, number of paper jams, and alarm signals. The management system is programmed locally or via a central management unit or host computer to control operational modes for the selected office machine(s) including machine access.

47 Claims, 10 Drawing Sheets

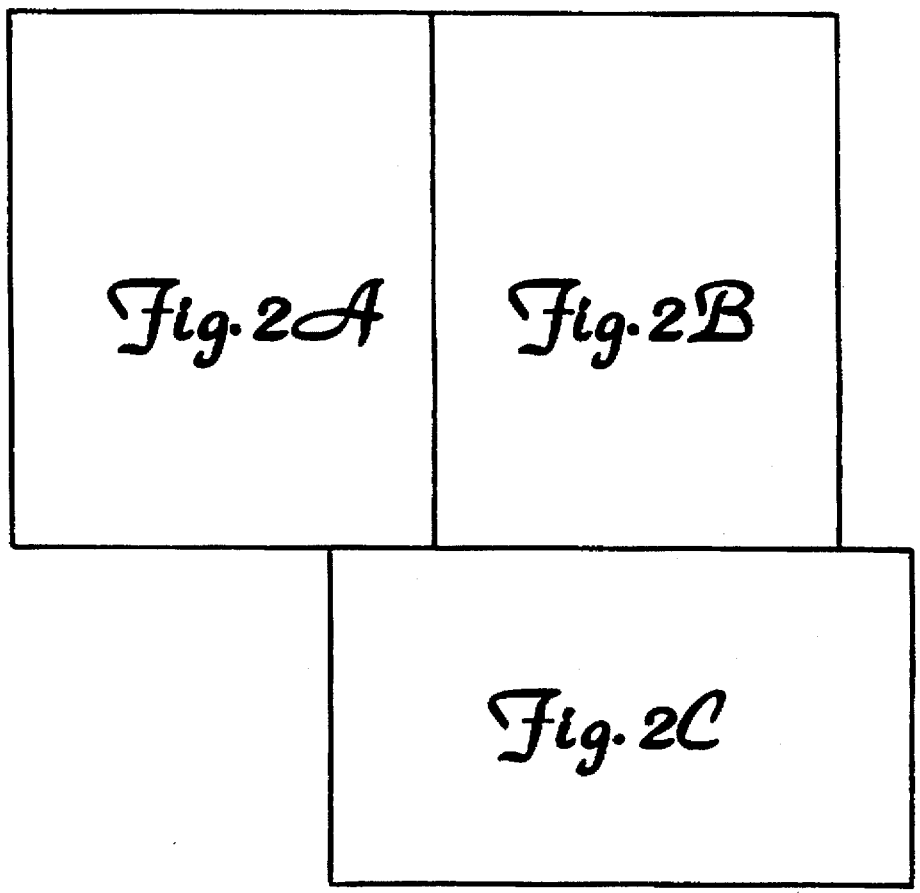

MULTIPURPOSE REMOTE OFFICE MACHINE MANAGEMENT SYSTEM

BACKGROUND OF THE INVENTION

1. Field of the Invention

The present invention relates generally to a office machine management system for monitoring and controlling one or more paper processors such as photocopy machines, fax machines, document scanners and printers, and more particularly to multipurpose system for achieving remote computer control and monitoring of one or more paper processors at predetermined times and dates via a communication network which may include a shared or dedicated telephone line, a serial interface or a radio frequency interface, or combinations thereof.

2. Description of the Prior Art

The present invention finds particular utility for use in combination with those certain standard office machines, including, but not limited to photocopy machines, fax machines, document scanners and printers, where it is desired to accomplish: 1) remote reporting the number of copies made to the selling and servicing dealer or leasing company for normal service or lease billing; 2) allowing the end user(s) of the office machine to enter a service request directly to a computer at the service center bypassing the need for a human telephone operator; 3) allowing a field service technician to enter service activity data from the customer site to a logging computer at the service center, thereby reducing the potential for error associated with manual reporting, and improving the efficiency of a service operation through more timely accounting for service activities, including the sale and ordering of spare parts; and 4) allowing end users to control the access to office machines and account for their usage by requiring individuals wishing to use the particular office machine(s) to enter a plurality of access codes to enable the machine(s).

Photocopy monitoring systems are known in the prior art. For example, U.S. Pat. No. 4,583,834, issued Apr. 22, 1986 to Seko et al. describes a copying apparatus which monitors a number of copying machines utilizing a number of sensors placed on the copier for sensing various operating parameters such as the number of copies made by the machine, machine malfunctions and the amount of toner remaining in the machine. Signals representing these parameters are transmitted to a central processor. The count values transferred to the central processor are at predetermined intervals. The inventive apparatus taught by the '834 patent provides no means for contacting the appropriate party such as a remote service man or billing center when a power outage has occurred or at a predetermined desired time and date.

Another photocopy monitoring system is known from U.S. Pat. No. 4,497,037, issued Jan. 29, 1985, to Kato et al. The inventive system taught by the '037 patent includes a plurality of terminal devices provided at each copying machine and a central managing unit for managing the terminal devices. Each of the terminal devices receives input signals indicative of a plurality of user identifications of the copying machine and a second input signal indicative of utilization associated with each user at each copying machine. These data signals are stored and later transmitted to a central managing unit. One of the disadvantages of this system is that it does not monitor operating malfunctions of the copier or notify a service center when preventive maintenance is required. Another disadvantage of this system is that it does not provide reports to a central managing unit independently without prompting by the central managing unit. Yet another disadvantage of this system is that it is not capable of communication over existing telephone lines.

Other photocopy monitoring systems are known from U.S. Pat. No. 5,077,582, issued Dec. 31, 1991, to Kravette et al. and U.S. Pat. No. 5,184,179, issued Feb. 2, 1993, to Tarr et al. Although the inventive systems taught by the '582 and '179 patents overcome many of the disadvantages of earlier photocopy monitoring systems, these systems have not successfully addressed particular disadvantages including the inability to easily communicate to a central managing unit or host at a predetermined time on a particular date. For example, the systems taught by Kravette et al. and Tarr et al. are limited to communicating with a central managing unit or host following either a predetermined time interval or a predetermined count interval rather than at a predetermined desired date and time. Furthermore, excepting activation/deactivation capability, these prior art systems are not able to alter a plurality of operating modes for one or more photocopy machines from a central managing unit or host. The systems taught by Kravette et at. and Tarr et al. also have other limitations such as the inability to communicate effectively over a shared telephone line without causing undue burdensome interference with other office machines and personnel sharing the same telephone line(s). Although these photocopy monitoring systems are capable of providing total copy count information for any particular photocopy machine, these systems are lacking in the ability to provide information as to the identity of the user of the photocopy machine.

Still, other types of monitoring systems, such as that taught by U.S. Pat. No. 4,086,434 to Bocchi, entitled Remote Condition Reporting System, describes a family of remote monitoring systems capable of reporting monitored data to a central reporting station at predetermined times and dates, thereby providing for additional operational enhancements beyond those taught by photocopy monitoring systems previously known to those skilled in the art. Although the system taught by the '434 patent offers the capability to extend monitoring systems to a new level of sophistication with the addition of predetermined time and date reporting capability, this system does not overcome other limitations with known systems, including, but not limited to, 1) inability to preestablish limits associated with individual users or groups of individuals to control access to the office machines when limits are reached and 2) inability to remotely monitor and report various office machine preventive maintenance parameters to a central management unit or host, without utilizing specific internally generated office machine firmware stream signals.

Accordingly, it is desirable to provide a system for monitoring and controlling one or more office machines which overcomes the shortcomings of the prior art systems described above.

SUMMARY OF THE INVENTION

The present invention, directed to a multipurpose office machine management system, includes at least a single stand alone micro con trolled device having multiple inputs and outputs. Typically, the inventive device is connected to an office machine such as a photocopy machine, for example, with a multi wire cable. Two of these wires are then used to enable the photocopy machine via a relay in the inventive device. Another two wires are connected to an opto-isolated transistor in the inventive device, and are used for counting the number of copies made. The inventive device has additional opto isolated .inputs that may be used as counters or level detection inputs, non-volatile RAM and a battery back-up calendar clock. These additional opto isolated inputs are used by the present inventive system for monitoring a plurality of photocopy machine operating characteristics, including, but not limited to, for example, attempts by unauthorized individuals to access one or more photocopy machines, the number of black and white or color copies, the number of copies duplicated, or perhaps to sense an alarm such as when the office machine runs low on ink or toner, for example. Communication with the inventive device is via an on board modem or a serial RS485 port to attach external input/output devices e.g., magnetic card readers, printers, radio frequency (rf) devices, or other devices well known to those skilled in the art. The on board modem can be coupled to either a dedicated or a shared telephone line without compromising the operational integrity of other devices sharing the same telephone line. The inventive device can function as either a master unit or a slave unit via the RS485 port utilizing alternative modes of communication well known to those skilled in the art e.g., programmable logic control (PLC) and radio frequency (rf). Data may be sent or retrieved by the inventive device via an optional key pad and LCD display unit that is plugged into the inventive device.

The present invention described above, provides an office machine monitoring and control system having features not heretobefore known or available in the prior art. For example, one feature of the present invention includes the capability to alter a plurality of operational modes for one or more office machines via commands from a central managing unit or host.

Another feature of the present invention includes the capability to monitor a predetermined attribute of one or more office machines and report the results to a central managing unit or host at a predetermined time and date.

Another feature of the present invention provides the capability to monitor and report predetermined attributes of one or more office machines via a plurality of communication modes from a singular communication port.

Yet another feature of the present invention includes the capability to monitor a predetermined attribute of one or more office machines without utilizing any office machine internally generated diagnostic signal which is embedded within the office machine firmware.

Another feature of the present invention includes the capability to preestablish limits associated with individual users or groups of individuals to control access to the office machine(s) when limits are reached.

Still another feature of the present invention includes the capability to communicate with a central management unit or host computer via a shared telephone line without causing inconvenience or interference with other office machines or personnel sharing the same telephone line.

A further feature of the present invention includes the capability to uniquely identify the end user of the particular office machine such that use of any particular machine can be associated with an individual, department or project for example, such that a central management unit can then control access to the particular office machine(s).

BRIEF DESCRIPTION OF THE DRAWINGS

Other features of the present invention and many of the attendant advantages of the present invention will be readily appreciated as the same becomes better understood by reference to the detailed description when considered in connection with the accompanying drawings in which like reference numerals designate like parts throughout the figures thereof and wherein.

DETAILED DESCRIPTION OF THE PREFERRED EMBODIMENT

The preferred embodiment of the present invention described as follows, addresses the considerable problems associated with controlling and monitoring office machines including, but not limited to photocopy machines, fax machines, document scanners and printers such as laser printers, ink jet printers, bubble jet printers, and the like. The invention includes a standard primary module and may also include additional optional modules to expand the capability of the system. The primary module is a monitoring device which is required for management of all office machines using the present inventive management system. The management system can be expanded by adding an external service module or a copy control unit or both. For the sake of clarity and brevity, the present inventive system will be described as it relates to management of photocopy machines. It will be understood by those skilled in the art that the inventive system is equally applicable to the management of other office machines such as, but not limited to, fax machine, printers and the like.

Figure 1:
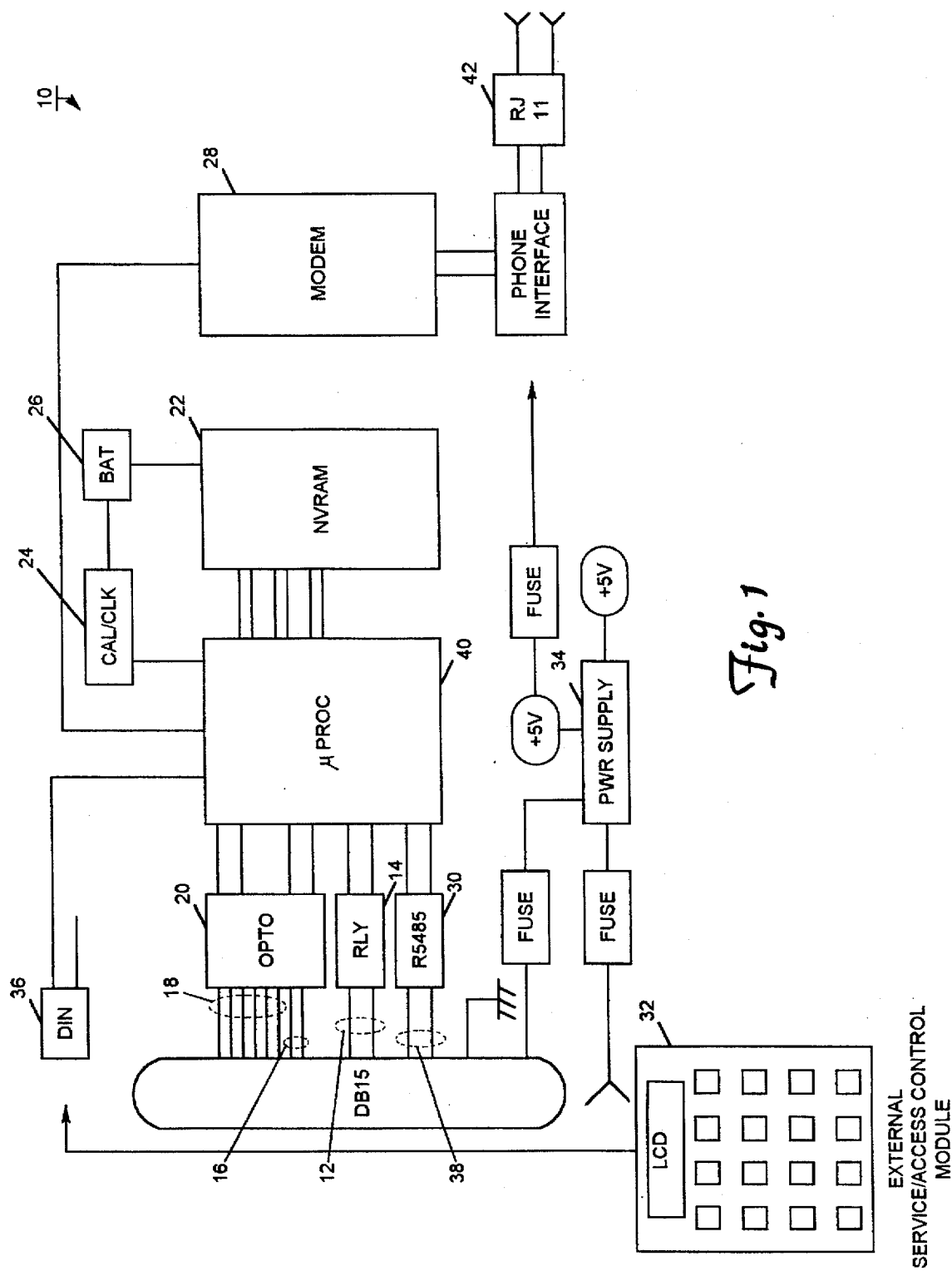
FIG. 1 is a block diagram of one preferred embodiment for the present inventive office machine management device.

Referring now to FIG. 1, a block diagram illustrating the primary module 10 is shown. The primary module 10 is a stand alone microprocessor 40 controlled device, with multiple inputs 12, 16, 18 and 38.

Typically, the primary module 10 is connected to a photocopy machine (not shown) with a four wire cable. It will be understood that other wire cables having more or less wires could just as well be used if so warranted and desired for a particular application. Two of these wires 12 are used to enable the photocopier (or other office machine) with a relay 14 in the primary module 10. Two additional wires such as those depicted by reference numeral 16 may be connected to an opto-isolated transistor (not illustrated) contained within opto-isolator 20, to count the number of copies made on the specific photocopy machine to which the primary module 10 is attached. One preferred embodiment for the primary module 10 has three additional opto-isolated inputs 18 that may be used as counter or level detection inputs. It shall be understood that the present invention is not so limited however, and that more or less than three additional opto-isolated inputs may be used.

One preferred embodiment for the inventive module 10 has a 32×8 non-volatile RAM 22 having expandability to (128×8 optional) and a battery 26 backed-up calendar clock 24 for supplying time and date information to microprocessor 40. Typically, power for module 10 is provided by a standard class 2 wall transformer or a battery (not shown) well known to those in the art.

Communication with module 10 is by way of an on board phone modem 28, preferably at least 1200 BAUD, or a serial RS485 port 30. Data may be sent or retrieved via an optional key pad and LCD display unit 32 that is plugged into module 10 via a standard DIN connector 36.

Optically isolated inputs DE15 (12, 16, 18) are programmable to be configured as counter inputs, level indicators, or combinations thereof. For example, some inputs may be counters and the others be level indicators on the same module 10.

As stated hereinbefore, communication with module 10 may be provided by way of a modem 28. Modem 28 is preferably a Bell 212A/103, 1200 BAUD phone line modem, Capable of full-duplex operation over dial up lines (not shown) to which it may be coupled via a standard RJ11 jack 42. It will be understood by those skilled in the art that modem 28 includes a tone generator and/or a pulse train generator for initiating communication with devices necessitating such specific requirements.

Communication with module 10 may also be provided via a RS485 serial input/output port 30 and/or a digital input/output connector 36 as stated hereinbefore. The present module 10 is designed to accommodate networking up to thirty-two modules 10 over a distance of 5,000 feet at speeds to 9600 BAUD or alternatively, via RS485 port 30 utilizing rf communication schemes well known to those skilled in the art. RS485 port 30 then allows module 10 to communicate asynchronously with a central management unit or a host computer (not shown) either by cable linking the host to the predetermined modules 10 or by using the rf schemes mentioned hereinbefore. However, it will be understood by those skilled in the art that the present invention is not so limited and that such system attributes are by way of choice only and that module 10 may just as well be designed to accommodate other desired network features.

Communication with either an external service module 32 or a machine access control module 32, or combinations thereof is by way of a digital input/output connector 36. Looking now at FIG. 2, a combination external service/copy control module 100 is illustrated. Module 100 incorporates features well known to those skilled in the art and will not be discussed in detail for the sake of clarity. Preferably, module 100 incorporates features allowing entry of either numeric and/or alphanumeric data via a keypad 102. Preferably, keypad 102 includes a 4×16 key or a 5×8 40 key matrix membrane pad and a 2×24 LCD, although other combinations and sizes may also be used as desired. Primary module 10 and optional module 100 may be coupled together via DIN connector 36 or alternatively, may be incorporated into a common enclosure thereby eliminating the necessity for a line cord or a DIN connector.

Management System Operation

Figure 2A:
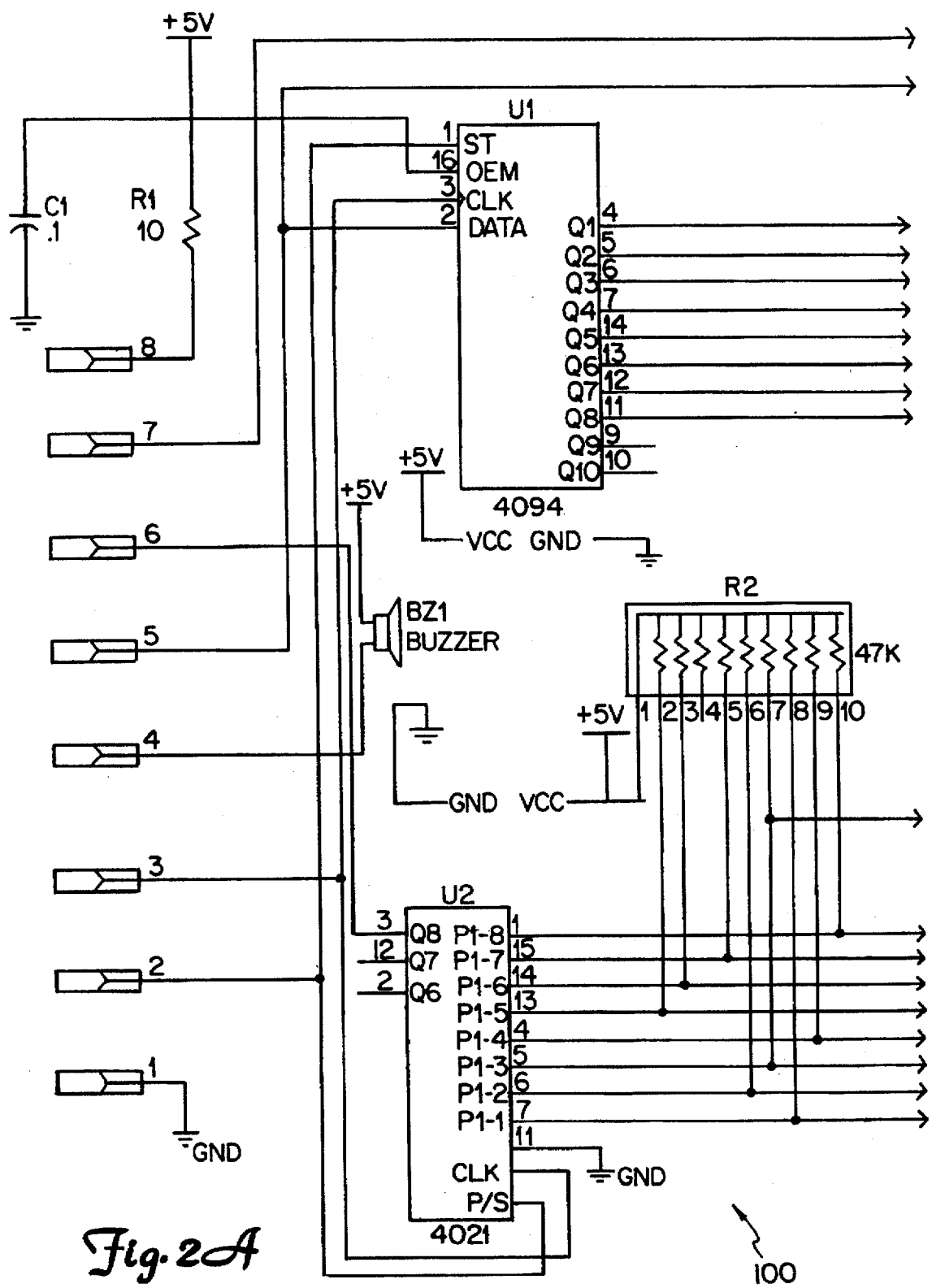
FIG. 2 is a schematic diagram of one preferred embodiment for the external service/access control module.
Figure 2B:
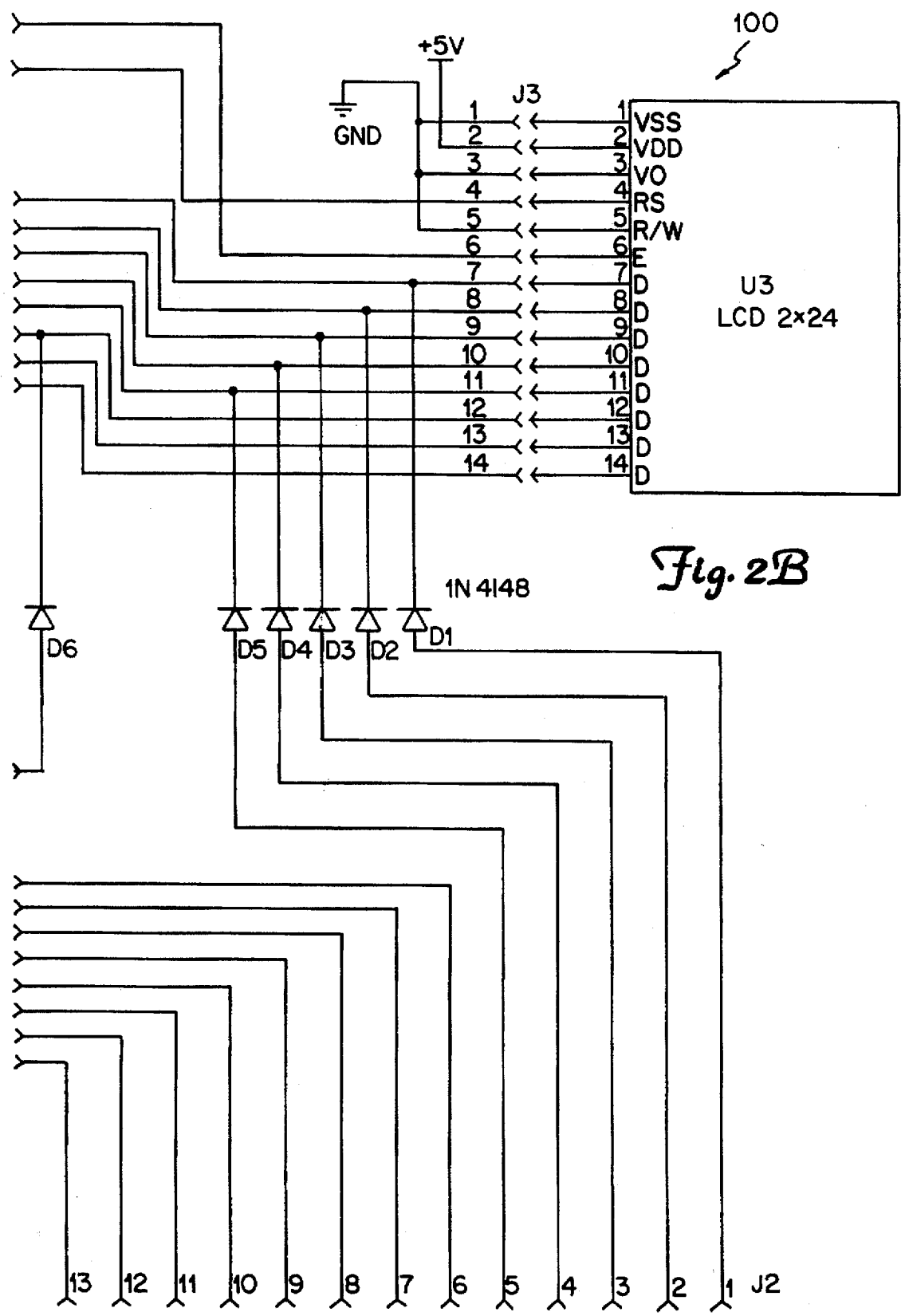
Figure 2C:
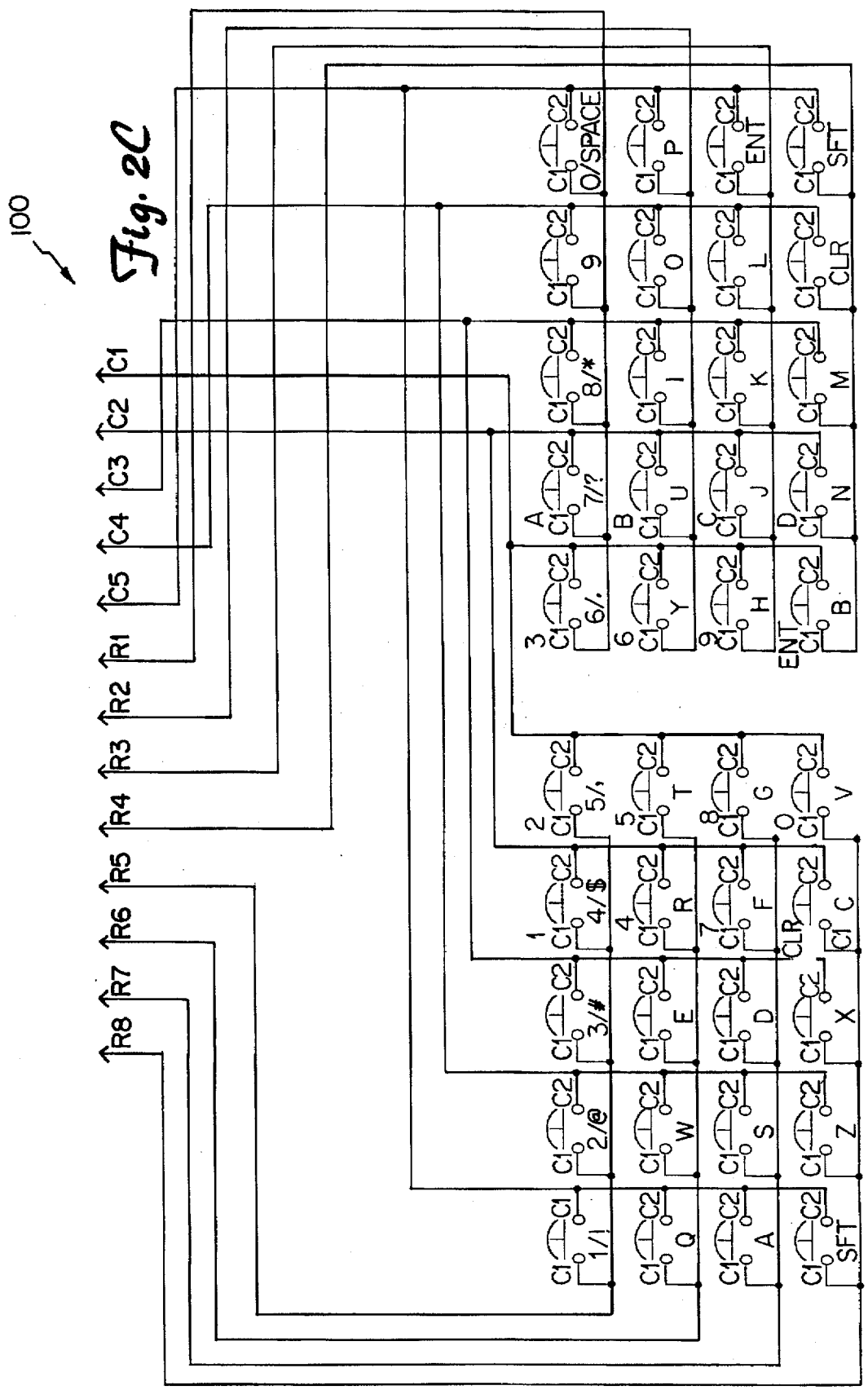

Operation of the inventive multipurpose office machine management system will now be discussed making reference to FIGS. 1 and 2 as well as additional FIGS. 3–7. Module 10 responds to outside events in two ways. The primary way is to count events that occur, e.g., pulses representing copies produced on a photocopy machine for example. The count totals are then uploaded to a host computer during the periodic time based calls. The secondary way is to record time and date stamped events. Events may be programmed in such a manner that they are: a) ignored, b) saved in memory awaiting a subsequent phone call or command to be uploaded or c) cause the primary module 10 to immediately generate a call to a host computer. Events are defined in the firmware 22 of module 10. Events include, but are not limited to items such as: illegal phone attempts, no phone answer at host, change of state of a sensing circuit, items entered via service/copy control module 100, and limits reached (copy control). A special event class is defined as an Alert Limit. These are preset counts, that when reached, cause an event to be triggered. The primary application is to generate a call after a preset number of copies have been produced.

Advantages are thus provided by the inventive system beyond those presently available with office machine monitoring and control systems known to those skilled in the art. As stated hereinbefore, the present invention provides the capability to effectively communicate with a central management unit or host computer at a predetermined time and date via choice of communication mode, including, either a shared telephone line or a dedicated telephone line. As stated hereinbefore, alternative communication modes may also be employed, such as programmable logic control, multiple serial communication modes, or various rf schemes. Other novel features and further details of the above described advantages will now be discussed.

Inventive module 10, as presently structured, will monitor the opto-isolator 20 inputs DB15 as configured on initialization from a host computer using a modem 28 command set. When an alarm level is reached for example, and if so configured, module 10 will initiate an alarm phone call. During normal operation, the module 10 will monitor the calendar clock for its time to make a report phone call; or, after verification that it is in the programmed answer window, it may go off hook on ring detection. In one preferred embodiment, the modem 28 and RS485 (30) line share the same serial port from the microprocessor 40. When the modem 28 is not in use, module 10 monitors the RS485 port 30 for its address. This mode of operation is the preferred default mode for the module 10. In this SLAVE mode, module 10 will only respond when spoken to. A MASTER mode allows module 10 to poll additional RS485 devices on a shared network.

Copy control is enabled by the host during an initialization procedure, whenever module 10 is utilized in conjunction with a central management unit or host computer. This function deactivates (opens) the relay 14 until a correct USER number is entered through the External Service/Copy Control Module 32. The USER number is then reported back to a host, either by modem 28 or vias RS485 port 30.

The preferred embodiment utilizes distinct totaling counters embedded in memory 22 for each USER, including individual, department and/or project identification. This approach is preferred because it will allow use of module 10 in stand-alone (non-networked) situations and avoids "memory full" situations. The architecture of module 10 firmware 22 allows for system expansion utilizing multiple modes of communication well known to those skilled in the art to accomplish implementation of copy control based upon the approach of recording authorized events e.g. ,once a USER enters a valid ID, the number of copies produced will be recorded as a specific time and date stamped event of a predetermined type. This technique provides additional system flexibility useful in implementing larger transaction recording systems.

In the preferred embodiment, messages may be sent to module 10 from the host computer for display on the module 32 LCD display 44 in one of two modes. In the first mode, data is sent and accepted by the module 10 which then waits for the next command. The information downloaded from the host remains in the memory 22 of module 10 until the host hangs up the phone. At this point, the data is scrolled on LCD display 44. In the second mode, data may be sent to the LCD display 44 which will be displayed immediately. Module 10 then waits for an operator response before accepting another command. If no response is obtained for a predetermined period of time e.g., 90 seconds, a time-out message is sent and the unit will accept further commands. However, the present invention is not so limited, and it will be understood by those skilled in the art, that other time periods may just as easily be utilized. Preferably, messages sent to module 10 remain in memory 22 until an empty message is sent from the host or the message is cleared by the system USER. Typically, this is accomplished by hiring a clear key while data is being scrolled from memory.

The preferred embodiment for the office machine management system assumes that module 10 responds to asynchronous requests for information from the host computer. During this communication, some or all the information stored in the memory 22 will be uploaded to the host. The communication flow, however, will always be initiated from the host and will function in a command/respond mode where the module 10 is always responding to requests from the host. Preferably, keypad 102 input is given priority over the host.

Preferably, module 10 may be put into a "transparent mode" as is known to those skilled in the art. In this mode, normal processing is suspended and control is transferred to a host computer. In this mode, the host computer is in complete control in that it validates IDs, authorizes the module 10 to allow copies to be made, and records events, totals, etc. The host computer can: send a message for display on the LCD display 44, inquire if module 10 has a message, instruct module 10 to enable a predetermined number of copies, inquire if module 10 has a transaction request. Module 10 preferably accepts commands from the keypad 102, and also responds to requests from the host by sending data when asked, counting copies against a limit, etc.

Figure 3:
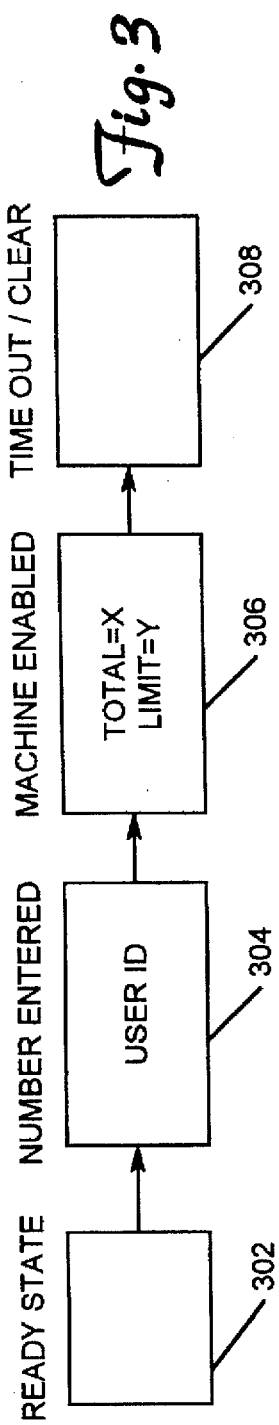
FIG. 3 is a flow diagram illustrating one method for monitoring and controlling a particular end user of an office machine.

Moving now to FIG. 3, there is illustrated a flow diagram showing one preferred process for implementing copy control for a photocopy machine for an individual end user via keypad 102 entries. The copy control function is activated by a host when the module 10 is initialized. The module 10 will then open the ENABLE relay 14 and close it only after a verified USER number has been entered on the external service/copy control module 32. In FIG. 3, the USER number identifies an individual person. Following initialization, module is ready and waiting for an input from a USER as depicted in block 302. In block 304, the USER enters their ID, which then causes module 10 to close relay 14 if the ID is recognized as a valid ID. In one embodiment, each ID includes a six digit accumulator and a programmable six digit limit which is depicted in block 306. A preferred method allows individual USER, department or project IDs to be entered (added), deleted maintenance menus on the external service/copy control module 32. Preferably, only limits may be edited. The preferred method is to allow the host computer to perform the same programming functions; and to maintain system integrity by allowing the host computer to lock out the ability to change individual User, department and project IDs from the external service/copy control module 32 as well as changing limits.

Figure 4:
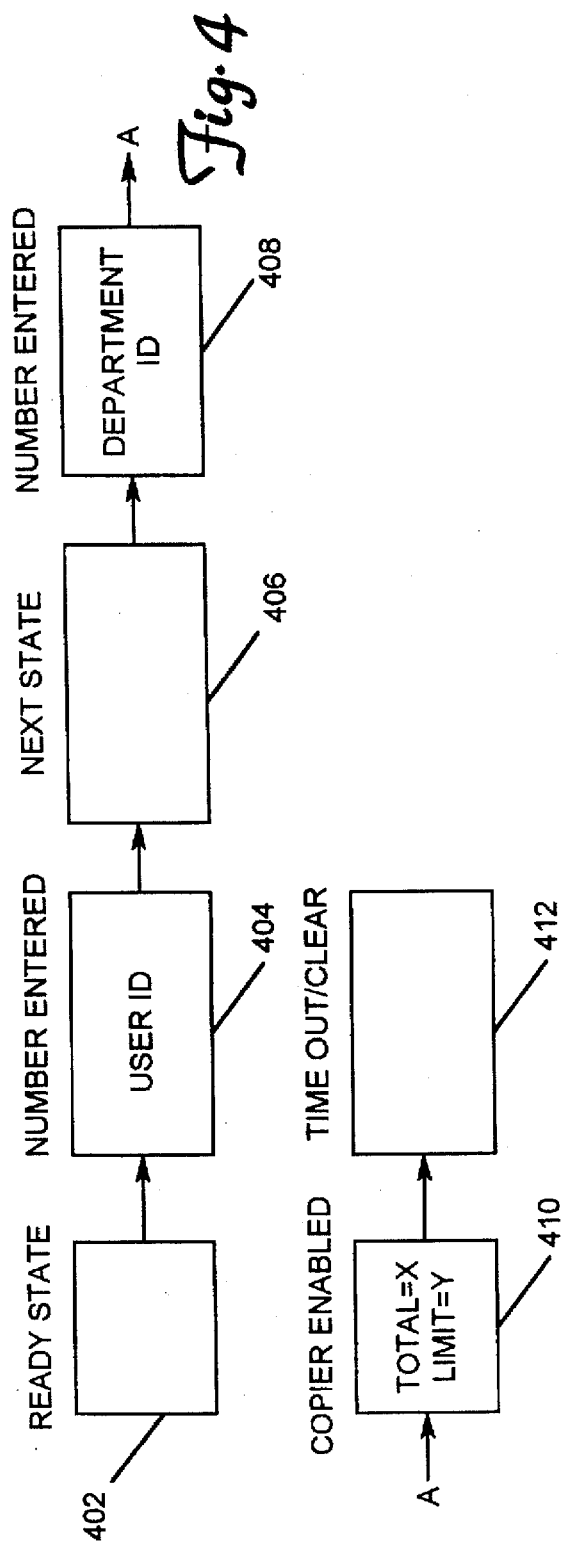
FIG. 4 is a flow diagram illustrating a second method for monitoring and controlling a particular end user of an office machine.

FIG. 4 illustrates a flow diagram for one preferred method of implementing copy control requiring both an individual USER ID as well as a department ID.

Figure 5:
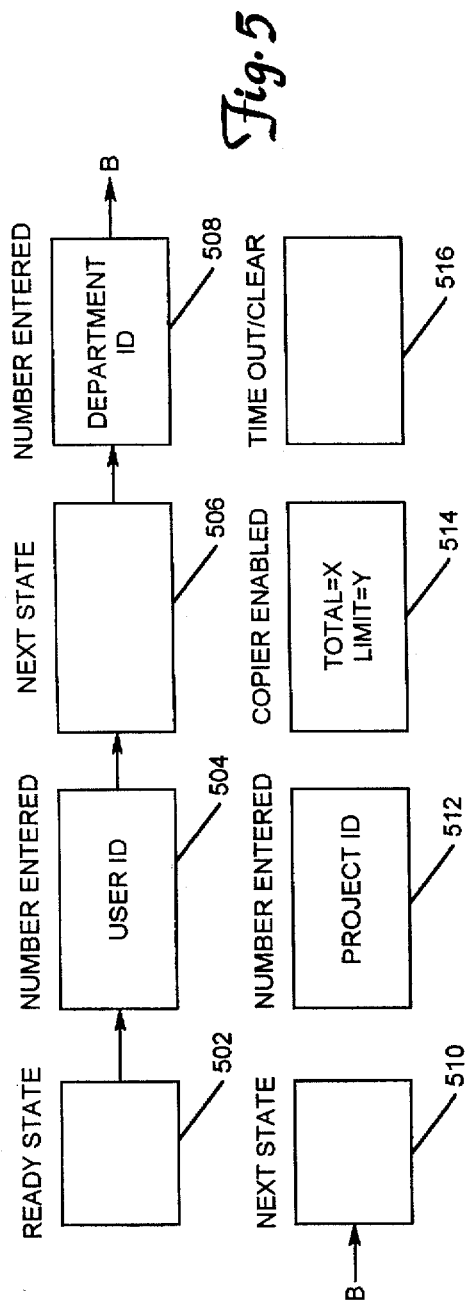
FIG. 5 is a flow diagram illustrating a third method for monitoring and controlling a particular end user of an office machine.

FIG. 5 illustrates yet another flow diagram for one preferred method of implementing copy control requiring a plurality of IDs including an individual USER ID, a department ID and a project ID. The copy control methods depicted in FIGS. 4 and 5 operate in like manner as that discussed hereinbefore for the method illustrated in FIG. 1 with the exception of requiring additional levels of USER identification e.g., 1) individual, department, project and/or client matter and 2) attorney, client and/or matter. Therefore, the methods depicted in FIGS. 4 and 5 will not be discussed for the sake of clarity and brevity.

Figure 6:
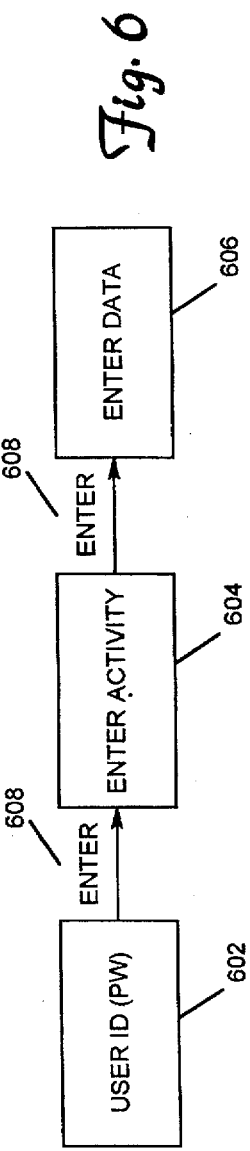
FIG. 6 is a flow diagram illustrating one method for entering service request information to a central management unit or host computer.

Moving now to FIG. 6, a flow diagram depicting one preferred method for reporting service activity is illustrated. The present invention allows a plurality of unique codes defined by a service center to be sent by a service technician to a predetermined alarm phone number for the purpose of recording service activity from the customer site. Functionally, the difference between this activity and a service call request function is that all data is maintained in the module 10 memory 22 and the call to the host computer is made only after the log off is entered. Operation is as follows: 1) the module 10 password (ID) is entered as shown in block 602 followed by ENTER 608; 2) an activity code is entered as shown in block 604, again followed by ENTER 608; and 3) numeric/alpha data characters are then entered as shown in block 606. Activity codes are entered until a log-out code is entered. Following entry of the log-out, the module 10 will make a phone call, report the information stored in its memory, and after module 10 has gone off hook, display a message on the external service/copy control module 32 sent from the host computer. It will be understood by those skilled in the art of programming that other methods may also be effectively used.

Figure 7:
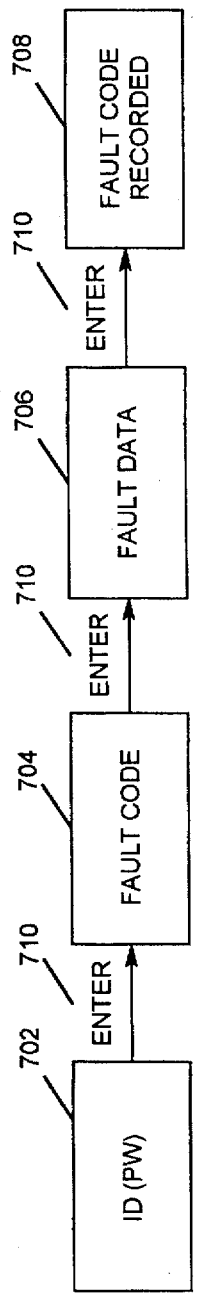
FIG. 7 is a flow diagram illustrating one method for reporting service activity information to a central management unit or host computer.

FIG. 7 illustrates one preferred method for implementing service requests in conjunction with using the present inventive multi-purpose office machine management system. A plurality of unique service center defined event codes may be entered into the module 10 to indicate the need of service for the particular office machine to which the module 10 is interfaced. One preferable sequential method is as follows: 1) A USER password (ID) is entered into module 32 as shown in block 702 followed by ENTER 710 and subsequent 2) entry of an event code as shown in block 704 discussed above again followed by ENTER 710; 3) a numeric or alphanumeric character is next entered into module 32 as shown in block 706 followed by ENTER 710, depending on whether module 32 utilizes a numeric or alphanumeric keypad 102 respectively. At this point, the module 10 preferably makes a phone call, reports the specific fault, and after the module 10 has gone off hook, displays a message on the external module 32 sent from the host computer. Preferably, a call is always made after the fault code is entered, although the present invention is not so limited and those skilled in the art of programming will understand that such a method is a matter of preference.

Figure 8:
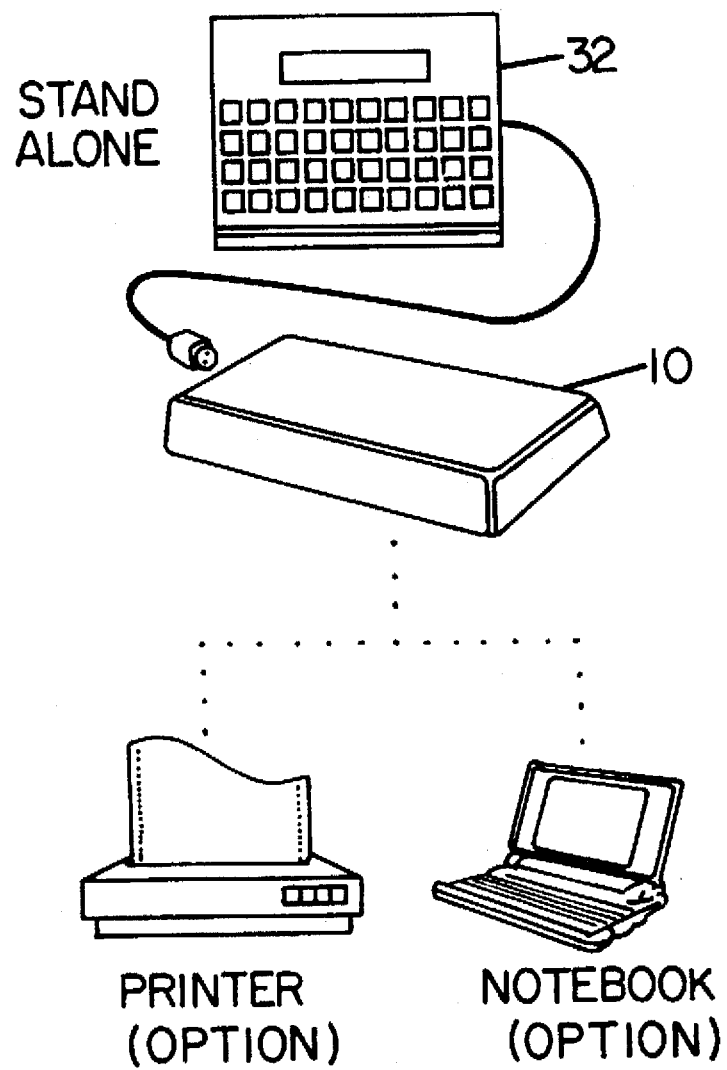
FIG. 8 illustrates an office machine management system in accordance with the present invention depicted in a stand-alone environment showing the device of FIG. 1 in control of a printer and interfacing with a local computer.

Moving on now to FIG. 8, a management system in accordance with the present invention is illustrated in a stand-alone environment in which the management system primary module 10 is in complete control of a printer and/or another primary module 10 at one time thereby serving as a master unit. This configuration exemplifies the system stand alone capability and it will be appreciated by those skilled in the art that other stand alone system configurations may also be implemented with use of modules 10 and 32.

Figure 9:
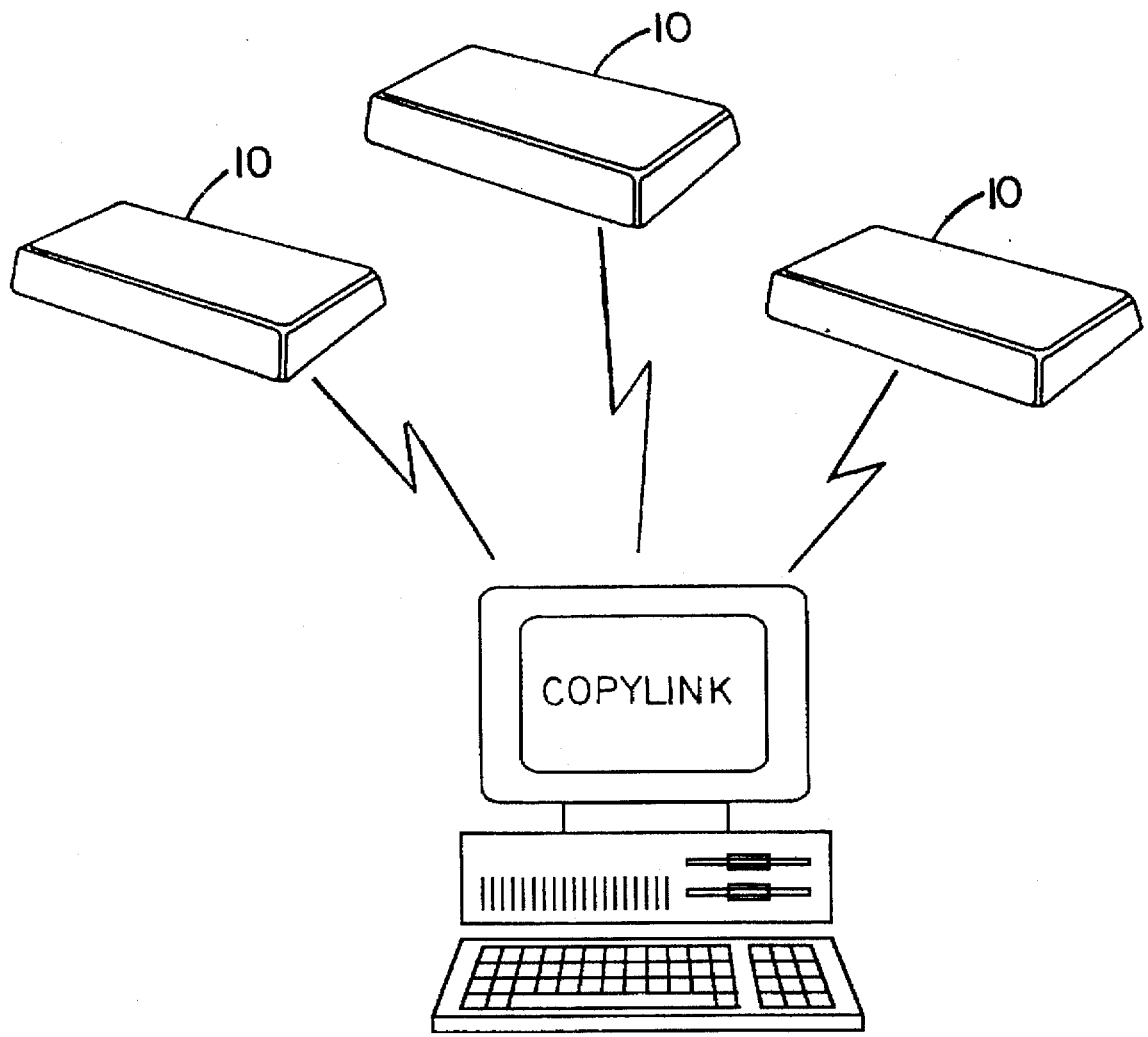
FIG. 9 illustrates an office machine management system in accordance with the present invention applied in a setting requiring multiple remote locations and in communication via its internal modem.

FIG. 9 illustrates a management system in accordance with the present invention applied in a setting requiring multiple remote locations.

Figure 10:
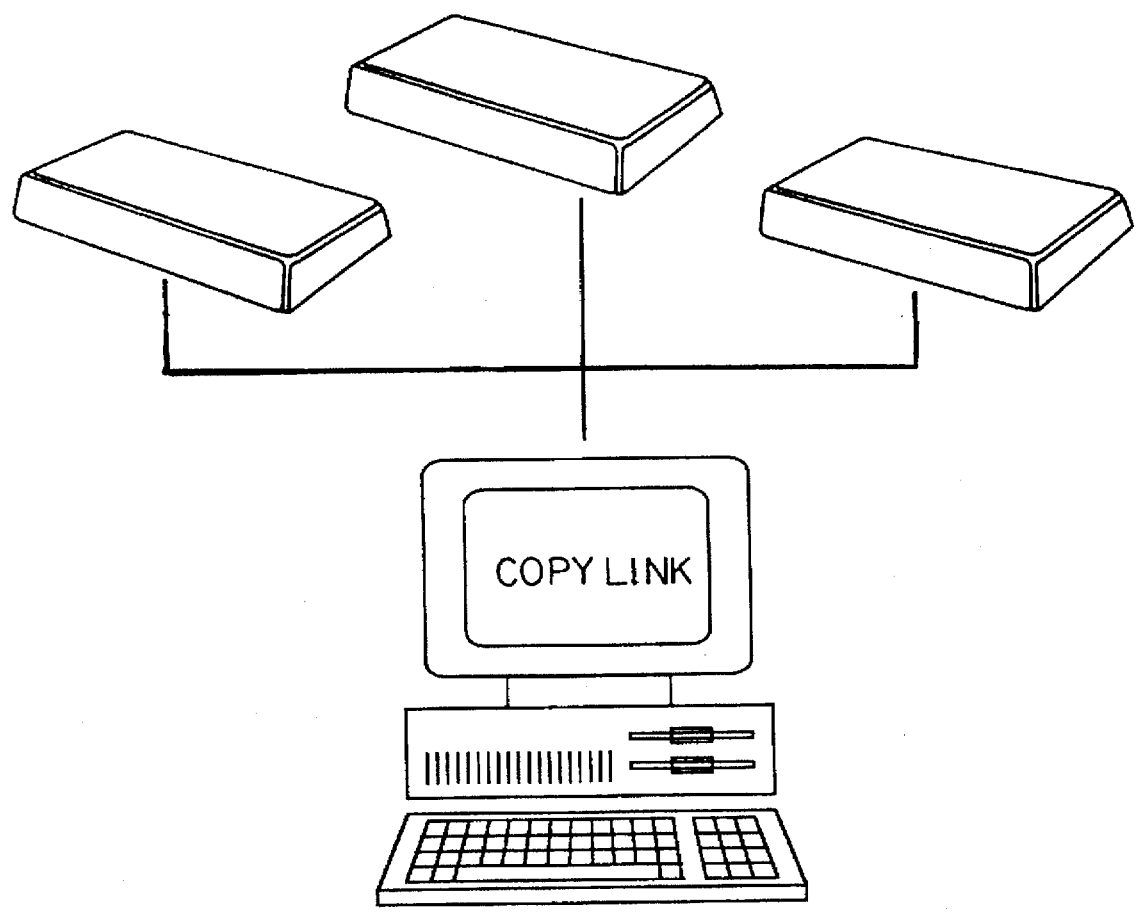
FIG. 10 illustrates an office machine management system in accordance with the present invention as it would appear in a large building or campus environment utilizing the RS485 protocol network, polled by a host computer.

FIG. 10 illustrates a management system in accordance with the present invention as it would appear in a large building or campus environment for example. The system cnfigurations depicted in FIGS. 8–10 are not so limited however, and other system configurations could be achieved if so desired by the end user(s).

As stated hereinbefore, communication to and from the host computer is via modem 28 or RS485 port 30 and preferably is in short ASCII string format, whether or not cable linked. The present invention is not so limited however, and it will be readily appreciated by those skilled in the art that other communication formats may also effectively be utilized to communicate between the office machine management system in accordance with the present invention and a central management unit or host computer.

Returning now to FIG. 1, primary module 10 is connected by a cable (not shown) to the foreign interface port or external counter interface of the photocopy machine (not shown). As stated hereinbefore, module also connects to a standard dial-capable phone line (not shown). This primary connection of module 10 allows module 10 to: 1) count the number of copies produced and call a host computer at a predetermined time and date to report the total number of copies made; 2) call a central management unit or host computer after preset numbers of copies have been made; a plurality of independent values may be set for functions such as scheduling of preventative maintenance scheduling shipment of supplies and renewing a service contract, for example; 3) enable or disable the operation of the copier based on a command from the host computer, as stated hereinbefore; and 4) log telephone problems such as attempts by unauthorized individuals to call the module 10 or the host computer not answering the module 10 when it calls.

For photocopy machines equipped with appropriate, vendor-supplied interface harnesses, the module 10 allows three additional inputs 18 from the photocopy machine. These inputs 18 may be programmed to count events from these inputs 18. For example, counting primary and secondary copies made by a duplicator, counting black and white and color copies, counting the number of paper jams. These secondary inputs 18 may also be programmed to serve as alarms. In this mode a service call is made to a host computer any time a change occurs on the function being monitored. For example, the module 10 may be configured to call the host computer every time the "call service" light comes on or the "add toner" light comes on. Techniques for programming such events are well known to those skilled in the art of programming and therefore will not be discussed in detail for the sake of clarity. It will be appreciated by those skilled in the art that management of such office machine features does not require that module 10 interface with any existing internal firmware for the particular office machine (s) interfaced with primary module 10, and therefore offers a plurality of features not heretobefore known in the art of office machine monitoring and control.

The inventive structure of module 10 also allows for the incorporation of a capture time feature. For example, when setting up a monitor, it is possible to establish a capture time for the monitors associated with an individual company. The capture time is a "freeze in time" feature. It allows module 10 to capture a meter value at a particular time on a particular day for retrieval whenever the meter read call occurs. As stated hereinbefore, module 10 can be programmed to initiate phone calls at times which are compatible with a shared phone line. This feature is a result of the module 10 internal calendar clock unit 24, which provides the capability to monitor and report time and date information to microprocessor 40. Other photocopy monitoring/ reporting systems previously known in the art have only been able to communicate over dedicated telephone lines because of the inability to effectively time calls to a host in such a way that disruption with other devices sharing the telephone line would be avoided. The structure of module 10 allows sharing of phone lines with voice lines, fax lines, or modem lines, for example. Preferably, the phone line is an "analog line". Module 10 preferably checks to see that a line is available before making a call; and if the line is in use, module 10 goes into a retry sequence. It is preferable for incoming calls, that monitor 10 be programmed to answer for only a prescribed time window each day. During this window, module 10 will always answer on the first ring. Outside this window, module 10 will ignore the call, unless programmed to perform otherwise. Preferably then, module 10 is programmed to answer a phone call during the night when it will not interrupt the normal business use of the phone line. It will be appreciated that such programming methods are well known to those skilled in the art.

This invention has been described herein in considerable detail in order to comply with the Patent Statutes and to provide those skilled in the art with the information needed to apply the novel principles and to construct and use such specialized components as are required. However, while a particular embodiment of the present invention has been described herein in detail, it is to be understood that various alternations, modifications and substitutions can be made therein without departing from the spirit and scope of the present invention, as defined in the claims which follow. For example, it will be appreciated that a monitoring and control module similar to module 10, may be placed within an external module such as the present inventive external service/copy control module 32 to provide an even lower cost management network for remote copy control applications.

We claim:

1. A externally attached multi-purpose remote office machine management system device for reporting usage signals concerning the office machine being monitored, said device comprising:

a microprocessor including memory operatively associated therewith;

receiving means coupled to said microprocessor for receiving at least one signal indicative of at least one office machine usage condition to be reported, each said at least one usage condition signal being generated by any one of contact closure and pulse level change thereof, wherein said receiving means is adapted to solely receive usage condition signals which are distinct and isolated from internally generated office machine diagnostic signals and office machine data signals;

a calendar clock coupled to said microprocessor for supplying time signals indicative of date and time of day thereto;

a signal generator coupled to said microprocessor for generating signals at a predetermined time for initiating a call to a host computer and for transmitting data thereto corresponding to said signals indicative of said office machine usage conditions to be reported; and a controller coupled to said microprocessor for altering a mode of operation for said office machine via commands from said host computer.

2. The device according to claim 1 further including a serial interface means adapted for transferring said data to said host computer.

3. The device according to claim 1 wherein said receiving means includes a serial interface means.

4. The device according to claim 1 further including a radio frequency interface means adapted for transferring said data to said host computer.

5. The device according to claim 1 wherein said receiving means includes a radio frequency interface means.

6. The device according to claim 1 further including a shared telephone line interface means adapted for transferring said data to said host computer.

7. The device according to claim 1 further including a dedicated telephone line interface means adapted for transferring said data to said host computer.

8. The device according to claim 1 wherein said means for receiving signals includes means adapted for receiving signals indicative of a number of copies produced by at least one photocopy machine.

9. The device according to claim 8 further comprising means adapted to preestablish limits associated with at least one individual user to control access to said at least one photocopy machine when said limits are reached.

10. The device according to claim 8 further comprising means adapted to preestablish limits associated with at least one group of individuals to control access to said at least one photocopy machine when said limits are reached.

11. The device according to claim 1 wherein said means for receiving signals includes means adapted for receiving signals from said host computer to enable and disable at least one photocopy machine.

12. The device according to claim 1 wherein said means for receiving signals includes means adapted for receiving signals indicative of attempts by unauthorized individuals to access at least one photocopy machine.

13. The device according to claim 1 wherein said means for receiving signals includes means adapted for receiving signals indicative of a number of primary and secondary copies produced by at least one duplicator.

14. The device according to claim 1 wherein said means for receiving signals includes means adapted for receiving signals indicative of a number of black and white and color copies produced by at least one photocopy machine.

15. The device according to claim 1 wherein said means for receiving signals includes means adapted for receiving signals indicative of a number of paper jams for at least one photocopy machine.

16. The device according to any one of claims 2, 3, 4 and 5 further comprising means coupled to said microprocessor for on-site entry of service data, wherein said service data is conveyed to said host computer via said interface means.

17. The device according to claim 1 further comprising means coupled to said microprocessor for providing access control to at least one office machine.

18. The device according to claim 1 wherein said means for receiving signals includes means adapted for receiving alarm signals indicative of an emergency condition to be reported, and wherein said means adapted for receiving alarm signals is operable when an alarm signal is received for initiating a call to said host computer.

19. The device according to claim 1 wherein said means for generating signals comprises a tone generator.

20. The device according to claim 1 wherein said means for generating signals comprises a pulse train generator.

21. The device according to claim 1 further comprising means coupled to said microprocessor for receiving and testing receipt of an acknowledgment signal from said host computer prior to transmitting said data.

22. The device according to claim 1 wherein said means for receiving signals comprises a plurality of optically isolated signal input devices.

23. The device according to claim 1 wherein said microprocessor includes means for transmitting signals to said host computer, wherein said signals are indicative of a location of a photocopy machine coupled to said device.

24. The device according to claim 1 wherein said transmitting means is adapted to communicate with said host computer via a shared telephone line.

25. The device according to claim 1 wherein said transmitting means is adapted to communicate with said host computer via a dedicated telephone line.

26. The device according to claim 16 wherein said data entry means comprises keypad means coupled to said microprocessor for data entry thereto, and wherein said system further includes means for initiating a call to said host computer for establishing communication between said keypad and said host computer.

27. The device according to claim 16 wherein said means for on-site entry of service data, includes means adapted for entry of data indicative of service requests and service activity, and wherein said means for initiating calls at a predetermined time to said host computer for each said at least one office machine is adapted for conveying said data indicative of service requests and service activity via said transmitting means.

28. The device according to any one of claims 9, 10 and 17 wherein said means for access control, includes means adapted for on-site entry of alphanumeric data.

29. The device according to claim 28 wherein said means for on-site entry of alphanumeric data, includes means adapted for entry of a user identification code.

30. The device according to claim 29 wherein said means adapted for entry of a user identification code includes a keypad means coupled to said microprocessor for data entry thereto, and wherein said means for initiating a call to said host computer is adapted for establishing communication between said keypad means and said host computer.

31. The device according to any one of claims 9, 10 and 17 wherein said means for access control, includes means adapted for on-site entry of numeric data.

32. The device according to claim 29 wherein said means for on-site entry of numeric data, includes means adapted for entry of a user identification code.

33. The device according to claim 32 wherein said means for entry of a user identification code includes a keypad means coupled to said microprocessor for data entry thereto, and wherein said means for initiating a call to said host computer is adapted for establishing communication between said keypad means and said host computer.

34. A system for monitoring and controlling a plurality of office machines via externally attached office machine devices, comprising:

a plurality of externally attached office machine usage control and monitoring devices of the type having at least one microprocessor including memory operatively associated therewith, said externally attached devices comprising;

means coupled to said at least one microprocessor for receiving signals indicative of at least one usage condition to be reported, wherein said receiving means is adapted to solely receive usage condition signals which are distinct and isolated from internally generated office machine diagnostic signals and office machine data signals;

calendar clock means coupled to said at least one microprocessor for supplying time signals indicative of date and time of day thereto;

means coupled to said at least one microprocessor for generating signals at a predetermined time for initiating a call to a host computer and for transmitting data thereto corresponding to said signals indicative of said at least one usage condition to be reported; and means coupled to said at least one microprocessor for altering a mode of operation for at least one office machine within said plurality of office machines within said system via commands from said host computer.

35. The system according to claim 34 wherein said receiving means includes at least one serial communication interface means.

36. The system according to claim 34 wherein said receiving means includes a radio frequency communication interface means.

37. The system according to claim 34 wherein said communication network includes at least one shared telephone line.

38. The system according to claim 34 wherein said communication network includes at least one dedicated telephone line.

39. The system according to claim 34 wherein said communication network includes at least one serial communication interface means.

40. The system according to claim 34 wherein said communication network includes a radio frequency communication interface means.

41. The system according to claim 34 further comprising means coupled to each device within said plurality of devices for on-site entry of service data, wherein said service data is conveyed to said host computer via said communication network.

42. The system according to claim 34 further comprising means coupled to each device within said plurality of devices for providing access control to each office machine within said plurality of office machines.

43. The system according to claim 34 wherein at least one office machine within said plurality of office machines is a photocopy machine.

44. The system according to claim 34 wherein at least one office machine within said plurality of office machines is a fax machine.

45. The system according to claim 34 wherein at least one office machine within said plurality of office machines is a printer.

46. The system according to claim 34 wherein at least one office machine within said plurality of office machines is a document scanner.

47. The system according to claim 34 wherein at least one office machine within said plurality of office machines is a personal computer.

* * * * *